United States Patent [19]
Parrinello

[11] 3,874,361
[45] Apr. 1, 1975

[54] FOOD WARMER

[76] Inventor: John Parrinello, 8661 Paige, Warren, Mich. 48089

[22] Filed: Feb. 13, 1974

[21] Appl. No.: 442,050

[52] U.S. Cl. .......................... 126/19.5, 237/12.3 B
[51] Int. Cl. ............................................. B60h 1/04
[58] Field of Search ................ 126/19.5; 237/12.3 B

[56] References Cited
UNITED STATES PATENTS
| | | | |
|---|---|---|---|
| 3,013,548 | 12/1961 | Thomas | 126/19.5 |
| 3,288,129 | 11/1966 | Fox | 126/19.5 |
| 3,590,802 | 7/1971 | Fried | 126/19.5 |

*Primary Examiner*—Edward G. Favors
*Attorney, Agent, or Firm*—Arnold S. Weintraub

[57] ABSTRACT

A food warmer for maintaining foodstuffs in a heated condition while in transit, e.g., food delivery services and the like. The food warmer includes a heat insulated box having a pressure latch closure for sealingly closing the box. Coils are embedded within the peripheral top and bottom walls of the box. The coils are connected to hoses leading from a vehicle radiator for circulating heated fluid through the coils. Quick disconnect valves between the hoses and the coils provide interchangeability of food warmers or vehicles or both.

6 Claims, 3 Drawing Figures

PATENTED APR 1 1975                    3,874,361

FOOD WARMER

BACKGROUND OF THE INVENTION

1. Field of the Invention

The present invention pertains to devices for maintaining foodstuffs warm. More particularly, the present invention relates to devices for maintaining foodstuffs warm while in transit. Even more particularly, the present invention pertains to devices for maintaining foodstuffs warm and which are vehicle associated.

2. Prior Art

There have been developed a plurality of vehicle associated devices to maintain foodstuffs warm while in transit. See, generally, U.S. Pat. Nos. 3,624,356 and 1,263,804.

Many such devices maintain a heat content within the device by diversion of vehicle exhaust gases. See, inter alia, U.S. Pat. No. 2,526,923. Other devices teach the use of circulating fans in conjunction with heating elements, such as that taught in U.S. Pat. No. 3,288,129.

Other devices generate heat therewithin by the circulation therethrough of engine coolant, such as that taught in U.S. Pat. No. 2,533,881.

In U.S. Pat. No. 3,590,802 there is disclosed a device similar in principle to that taught in U.S. Pat. No. 2,533,881, but wherein the racks, upon which the foodstuffs are stored, are fixedly secured within the interior of the device and the engine coolant circulates directly therethrough.

The device taught in this patent has certain inherent drawbacks. Initially, there is no adjustability of the of the racks for accomodating varying sizes of packages containing the foodstuffs. Moreover, the coolant directly contacts the foodstuff since the engine coolant circulates through the racks. If rupture of a rack occurs, there is total loss of the foodstuff. Moreover, there is a tendency for odors to be created in the interior of the device when the coolant circulates through the racks. Additionally, the connection between the racks and the means for conveying coolant thereto are not amenable to interchange, i.e., changing devices, changing vehicles, and the like. Also, the device of this patent inherently loses a great deal of heat therefrom into the vehicle interior by virtue of its inadequate sealing.

Thus, the present invention overcomes all of the inherent drawbacks encountered in the prior art as outlines above.

SUMMARY OF THE INVENTION

The present invention provides a vehicle associated device for maintaining foodstuffs warm while in transit.

The device hereof generally comprises an insulated rectangular box having a rotatable door. A pressure latch mounted on the door cooperates with sealing means mounted thereon to prevent heat loss therepast.

Heating coils are embedded in the top and bottom walls of the box. The coils are adapted to have a fluid circulated therethrough, such as an engine coolant or the like.

Suitable conduits leading from an engine are connected to the coils for conveying the fluid thereto.

Quick disconnect means interposed between the coils and the conduits provide detachability therebetween.

The device hereof further includes adjustable racks disposed within the interior of the box.

By embedding the coils in the walls of the device, the interior of the device is heated by radiant energy or heat thereby obviating the possibility of contamination of foodstuffs by rupture of the coils, odors and the like.

The present device is particularily suitable for fast food delivery services.

The present device does not interfere with the normal heating and cooling systems of a vehicle and in particular the heating and cooling systems for passenger compartments.

For a more complete understanding of the present invention, reference is made to the following detailed description and accompanying drawing. In the drawing like reference characters refer to like parts throughout the several views in which:

DESCRIPTION OF THE PREFERRED EMBODIMENT

Figure 1:
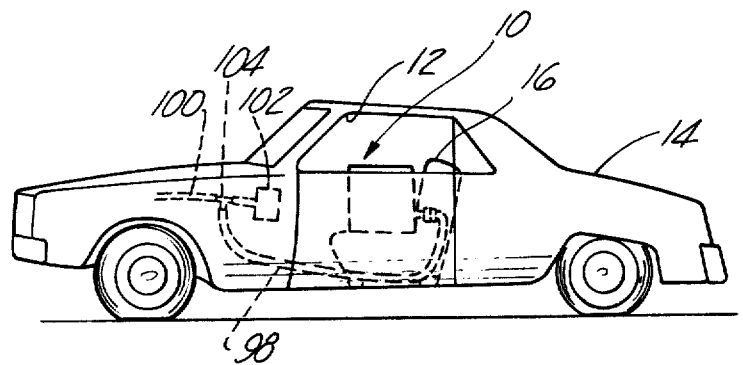
FIG. 1 is a side elevational view, partly in phantom, depicting a vehicle having the device hereof mounted for operation in associaton therewith.

In accordance with the present invention and with reference to the drawing, there is depicted therein a food warmer, generally indicated at 10, disposed within the passenger compartment 12 of a vehicle 14. The device 10 is dimensioned such that it can, if desired, be seated on a vehicle seat 16, as shown.

With more particularly, the device 10 herein comprises a box 18 having a top wall 20, a bottom wall 22, a back wall 24 and side walls 26 and 28, respectively, which cooperate to define an open interior 30 within the box 18.

Figure 3:
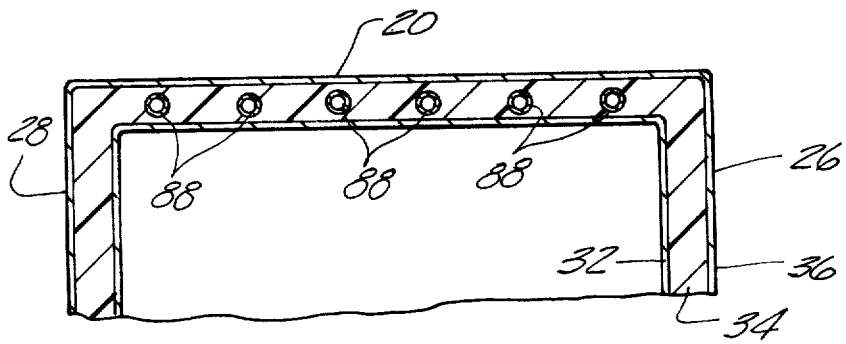
FIG. 3 is a cross-sectional view of the device of the present invention taken along the line 3—3 of FIG. 2.

As shown in FIG. 3, each of the walls are constructed or fabricated in a similar manner. Each of the walls includes an interior liner 32, and insulative layer 34 and an exterior liner 36.

The liner 32 can be made from any suitable material such as black iron, stainless steel, copper, aluminum or from any suitable rigid synthetic resinous material or plastic. Preferably, the liner comprises a black iron having a baked enamel coating deposited thereon. Optimally, the interior liner 32 is a 28 gauge black iron with a baked enamel coating.

The insulative layer 34 is disposed and adhered between the inner liner 32 and the outer liner 36. The insulative layer comprises any suitable material, such as, styrofoam, fiberglass, cellulosic fibers and the like. The insulative layer acts to maintain and retain the heat generated within the interior 30 of the box 18.

The exterior or outer liner 36 is substantially similar to the interior or inner layer 32. Optimally, the outer layer comprises a 26 gauge black iron having a baked enamel coating deposited thereon. However, this does not preclude the use of the hereinbefore enumerated materials.

Figure 2:
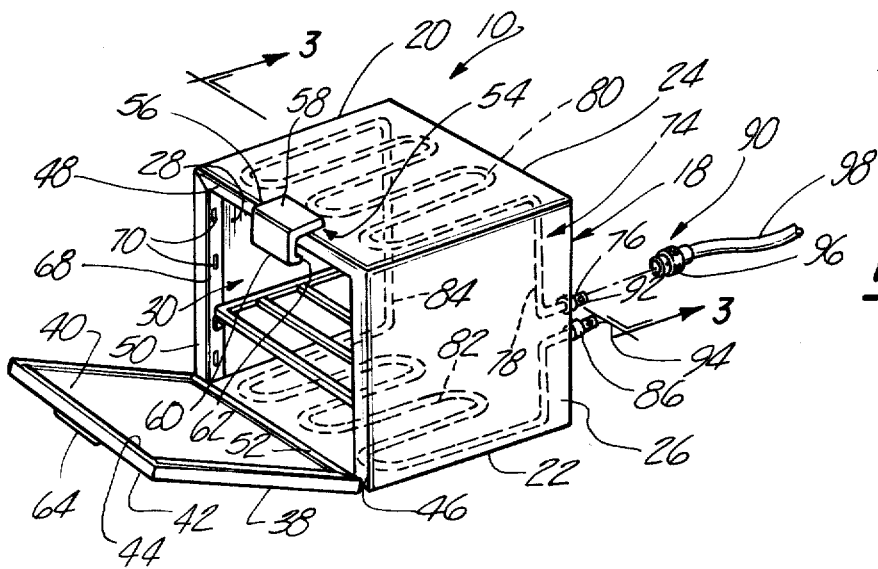
FIG. 2 is a perspective view, partly in phantom and partly exploded, of the device of the present invention.

As shown in FIG. 2, the device 10 hereof further includes a door 38 to close the box 18. The door 38 includes an inner layer or surface 40, an outer surface 42 and an insulative layer (not shown) sandwiched therebetween and in an manner analogous to that hereinbefore described with respect to the sandwiched layers 32, 34 and 36.

A sealing means, such as, a sealing gasket 44 is disposed about the periphery of the inner surface 40 of the door 38. The sealing means is affixed to the surface 40 in a predetermined manner such that upon closing of the door, the sealing means will be coincident with the free edges 46, 48 and 50 of the side walls and top wall 26, 28, and 20, respectively. Thus, upon closure a sealing of the box 18 is achieved.

The door 38 is rotatably hinged, at 52, to the box 18, at the free edge of the bottom wall 22 thereof. Preferably, a piano hinge is used for mounting the door to the box.

The device 10 also includes means for maintaining sealed closing of the box, such as a pressure latch, generally indicated at 54. The pressure latch 54 includes a J-shaped mamber 56 having its long leg 58 affixed to the top wall 20 of the box 18 in any suitable manner. The short or base leg 60 of the member 56 downwardly depends from the leg 58. A hook portion 62 extends from and is perpendicular to the leg 60 and substantially parallel to the leg 58. The hook portion extends toward the box 18, as shown.

The member 56 is preferably formed as an integral unit from any suitable material which exhibits some resiliency to permit opening of the door, as described hereinafter.

Still referring to FIG. 2, a clasp 64 is mounted on the outer surface 42 of the door 38. The clasp 64 engages the hook portion 62 to retain the door 38 in sealed closed engagement. To release the door 38, the J-shaped member 56 is rotated around the away from the clasp 64 as afforded by the resiliency of the J-shaped member.

Mounted on the interior surfaces of the sidewalls of the box are mounting brackets 68 only one of which is shown. A bracket is provided at each corner of the sidewalls and extends between the top and bottom walls. Each of the brackets include projections 70 adapted to seatingly receive thereon a rack or the like.

Each of the projections 70 on each of the brackets are in substantially planar relationship such that a rack can be adjustably moved from one height to another in a manner well known.

The present device 10, also, includes at least one rack 72 for seating within the interior 30 of the box 18 atop the projections 70 provided on the mounting brackets 68. The rack 72 has foodstuffs or packages of foodstuffs such as pizzas, chickens and the like, emplaced thereon.

Referring to FIGS. 2 and 3, a looped coil circuit 74 is embedded or otherwise provided in the insulative layer 34. The circuit 74 has an inlet 76 provided exteriorly of the box 18. The inlet 76 is integrally united with a first coil portion 78 which extends upwardly along the back wall and then extends into a looped-portion 80 disposed in the top wall 20.

From the looped--portion 80 the circuit 74 extends into a looped-portion 82 disposed in the bottom wall 22, via interconnecting conduit 84. The looped portion 84 extends into conduit 86 in the back wall 24, which, in turn, terminates in outlet 86.

The coils used in the circuit 74 is a continuous tubular member 88 which can be formed from any suitable material, such as, brass, copper, aluminum, stainless steel and the like.

As hereinbefore noted, the present invention, also includes quick disconnect means 90. The quick disconnect means 90 engages a needle valve 92 integrally formed with the inlet 76, as well as with the outlet 86, as at 94, although only the one associated with the inlet is shown. The quick disconnect means 90 includes a normally closed valve (not shown) which is opened upon engagement with the needle valve associated with the inlet and outlet. Upon disengagement therebetween the valve incorporated with the quick disconnect immediately closes.

The quick disconnect means 90, also, includes a spring-loaded or otherwise biassed lock 96 which is biassed into locking engagement with the inlet 76, in a manner well known.

The other end of the means 90 is coupled to a fluid conveying hose or conduit 98. The conduit 98 extends from the means 90 to the heater hose 100 (FIG. 1), intermediate the engine and the heater 102. It is to be understood that although only one hose is shown, the same assembly extends from the outlet 86 to the heater hose 100.

The conduit 98 is connected to the heater hose 100 through a T-connection 104 or other similarly functioning connector. In this manner, and assuming that the respective means 90 is coupled to the inlet and outlet, a portion of fluid from the engine, such as engine coolant, is diverted through the closed-looped circuit 74.

By diverting only a portion of the engine fluid, operation of the engine heating and cooling systems remain unimpaired.

Moreover, the quick disconnect means provide interchangeability between vehicles, as well as, of devices.

It should be further noted that the box 18 is preferably formed as a unitary member, having the sidewalls, the top wall and bottom wall, as well as the open side to which the door is attached.

By the practice of the present invention it is able to maintain the temperature within the interior 30 of the box 18 at between 150° to 180°F. This is especially useful in maintaining the foodstuffs, above-mentioned, in a heated or warm state. This, in turn, renders the present device particularly suited for use in fast food delivery and the like.

Having thus described my invention what is claimed is:

1. A food warmer device for maintaining foodstuffs in a warm state, the food warmer being associated with a vehicle and comprising:
   a. an insulated box having an open side, the box comprising an inner liner and an outer liner and having an insulation sandwiched therebetween,
   b. a door rotatably mounted on the box for closing the open side,
   c. a closed-loop coil circuit having a portion thereof embedded in the insulation in the box, and having an inlet and an outlet, the circuit further including:
      1. quick disconnect means detachably connected to the inlet and outlet,
      2. a fluid conveying conduit connected to the quick disconnect means associated with the inlet at the other end, and
      3. a fluid conveying conduit connected to the quick disconnect means associated with the outlet at one end thereof and to the heater hose at the other end, and d. at least one height adjustable rack disposed within the interior of the box.

2. The device of claim 1 which further comprises:
a. sealing means for sealingly closing the door, and
b. a pressure latch for maintaining sealed closure of the door.

3. The device of claim 2 wherein the door comprises an inner surface and an outer surface having an insulation sandwiched therebetween, the sealing means being affixed to the inner surface.

4. The device of claim 1 including mounting brackets disposed in the interior of the box, the rack being adapted to seatingly engage the brackets.

5. The device of claim 1 wherein the fluid is engine coolant.

6. The device of claim 1 which further includes connecting means disposed in the heater hose between the automobile engine and an automobile heater, the fluid conveying conduits being connected to said connecting means.

* * * * *